Sept. 6, 1932.  G. A. KOHOUT  1,875,616
DAMPER REGULATOR
Filed May 26, 1930  4 Sheets-Sheet 4
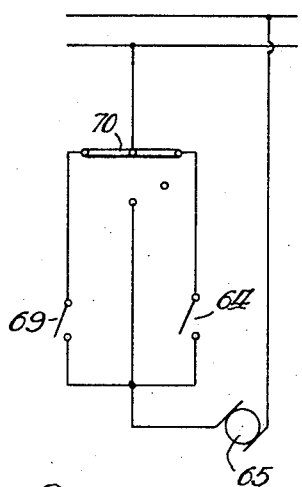
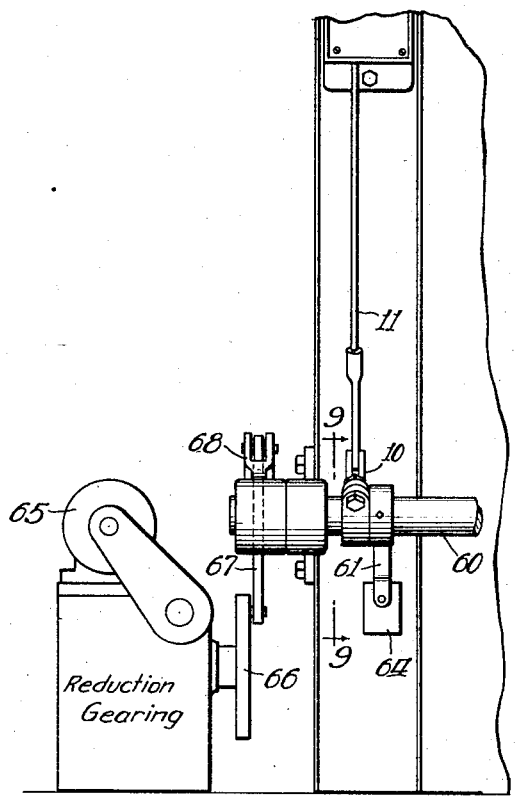
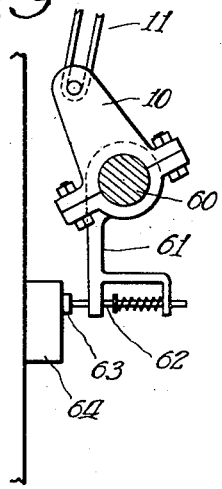
Inventor
George A. Kohout Patented Sept. 6, 1932

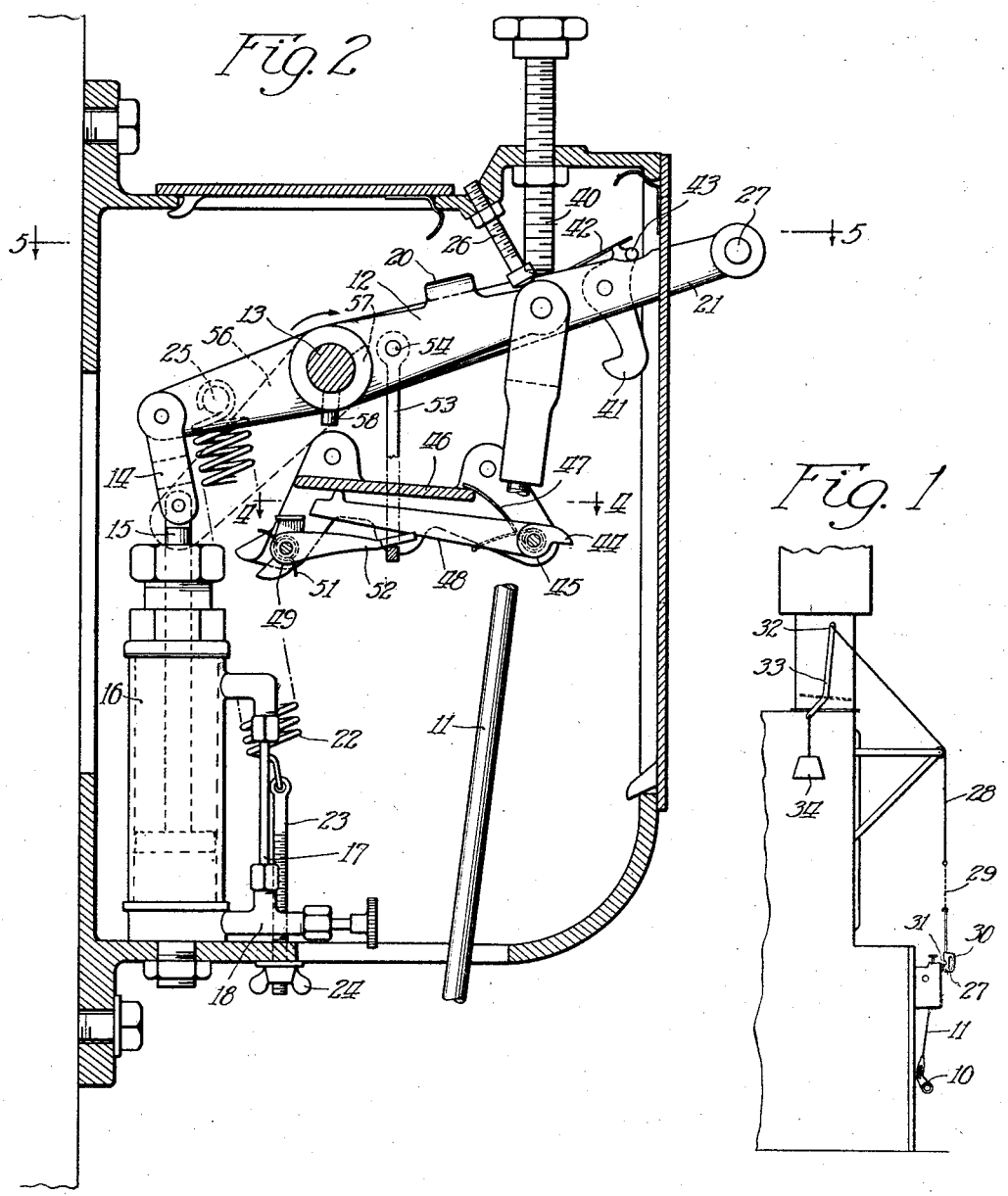

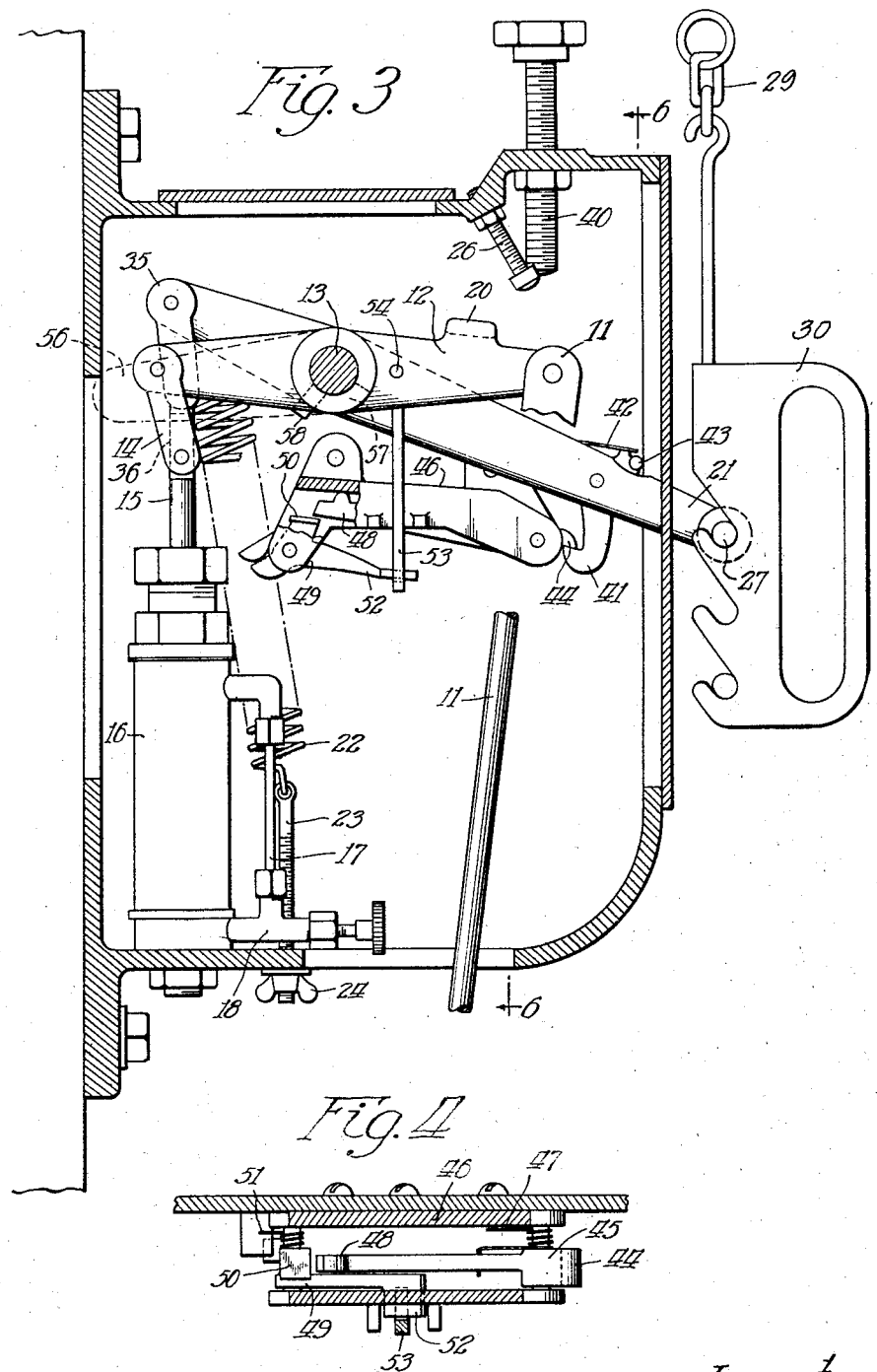

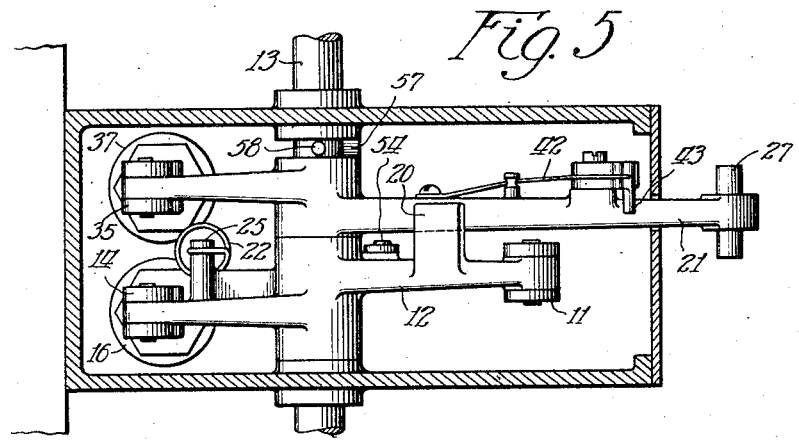
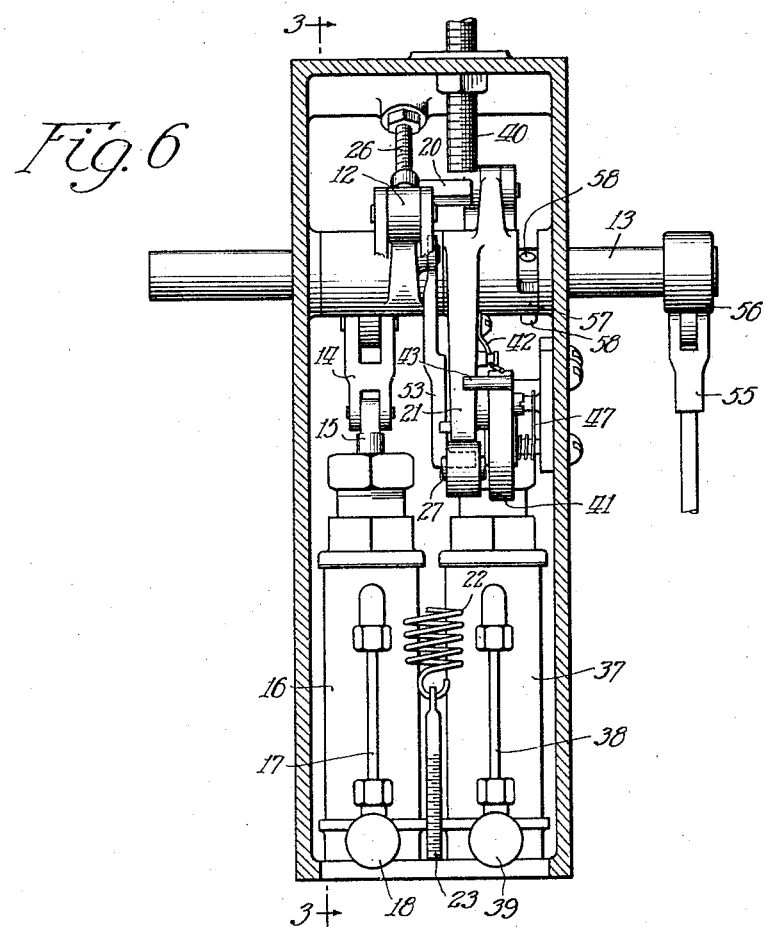

1,875,616

UNITED STATES PATENT OFFICE

GEORGE A. KOHOUT, OF CHICAGO, ILLINOIS

DAMPER REGULATOR

Application filed May 26, 1930. Serial No. 455,715.

My invention relates to damper regulating devices for furnaces and more particularly to an automatic damper opening and closing device adapted to operate in conjunction with the fuel feeding mechanism of the furnace to open the damper and close it at the proper time.

This application is an improvement over the structure disclosed in my prior application Serial No. 357,703, filed April 24, 1929.

It is the principal purpose of this invention to provide an improved mechanism whereby to control by purely mechanical action the operation of the damper in response to stopping and starting of the fuel feeding means.

Other and more specific objects of the invention will appear as the description proceeds when taken in connection with the accompanying drawings. It is to be understood, however, that the drawings and description are illustrative only and are not to be taken as limiting the invention except in so far as it is limited by the claims.

In the drawings—

Fig. 1 is a diagrammatic view showing the connections of the damper and the fuel feeding shaft to my improved means for controlling the operation of the damper;

Fig. 2 is a section through the pockets containing the control mechanism illustrating the position when the damper is closed;

Fig. 3 is a similar section illustrating another position when the damper is open;

Fig. 4 is a small sectional view taken on the line 4—4 of Fig. 2;

Fig. 5 is a section on the line 5—5 of Fig. 2;

Fig. 6 is a section taken approximately on the line 6—6 of Fig. 3 showing the mechanism just as it has been released to permit the damper to close;

Fig. 7 is a front view illustrating the drive shaft operating mechanism as shown in my prior application;

Fig. 8 is a diagrammatic view showing the wiring connections for the drive shaft operating mechanism; and Fig. 9 is a fragmentary section on line 9—9 of Fig. 7.

Referring now in detail to the drawings, the numeral 10 indicates a crank arm on the main fuel feeding shaft of the stoker which arm operates as illustrated in my prior application back and forth through a considerable angle and is so controlled as to stop at the top of its movement range when the power is cut off from the main fuel feeding shaft. The main fuel feeding shaft 60 has in addition to crank arm 10 a crank arm 61 thereon carrying a pin 62 adapted to engage button 63 of switch 64 so as to open the circuit through this switch when crank arm 10 is in its raised position as shown. Switch 64 is a part of the control of motor 65 which is connected by means of reduction gearing to crank 66 as described in my prior application. Crank 66 is connected by link 67 and arm 68 to shaft 60 for rocking the shaft.

The operation in stopping motor 65 in such fashion as to leave crank arm 10 in raised position may be best understood by reference to Fig. 8, the wiring diagram. One side of motor 65 is connected directly to one side of a source of current, but the other side of the motor is connected to the source of current through switch 64 and a switch 69 in parallel. Now when the machine is running, switch 69 is closed, and switch 64 is periodically opened when pin 62 presses down button 63. So long as 69 is closed, the motor still receives current even though 64 is periodically opened. When 69 is opened to stop the motor, the motor continues to receive current through 64 and drive the shaft 60 until crank arm 10 reaches its raised position as shown in Fig. 9 when pin 62 opens switch 64 and the motor stops. In this manner crank arm 10 is caused to stop in raised position at all times. The crank 10 is connected by means of rod 11 which has a sliding connection therewith as illustrated by Fig. 1 to a lever arm 12. This lever arm is pivoted on a main shaft 13 within the casing of the control box and has one end connected by means of the link 14 to the piston rod 15 of a suitable dash pot 16. This dash pot has a by-pass suitably controlled by the valve shown at 18 so that the rate of travel of the piston 15 may be adjusted by changing the setting of the valve 18. Lever arm 12 has a laterally extending lug 20 extending over a second lever arm 21 also pivoted on the shaft 13. Spring 22, the tension of which may be adjusted by means of the bolt 23 and nut 24, is secured to the lever arm 12 by means of the lug 25 so as to tend to pull the arm 12 into the position shown in Fig. 2 where further movement due to the pull of the spring 22 is prevented by means of the stop 26 mounted on the casing.

The lever arm 21 is connected at 27 to a flexible member 28 usually in the form of a cable having means at 29 in the form of chain links for adjusting its length and having hand grip member 30 provided with notches at 31 for further quick adjustment or detachment. The flexible member 28 connects to one end 32 of bell crank 33 mounted on the damper shaft. The other end of the bell crank 33 has a weight 34 suspended therefrom which weight tends to hold the damper in its closed position.

The lever arm 21 has a link 35 at the end opposite the connection 27 which link connects to piston rod 36 of a second dash pot 37 having the by-pass 38 controlled by valve 39. The adjustable stop 40 screw-threaded in the casing limits the movement of arm 21 upwardly by weight 34 and flexible member 28.

Now each time the crank 10 moves to lower position it pulls the lever arm 12 down with it. On the return movement, however, of the crank 10 the dash pot 16 retards the upward movement of lever arm 12 so that it does not rise very far until crank 10 again pulls it down. When the lever arm 12 is pulled down into its lower position by crank 10, it carries with it by means of the lug 20 lever arm 21. Lever arm 21 has a latch 41 pivoted thereon and yieldingly held in the position shown in Fig. 2 by means of the spring 42 and stop 43. This latch when the arm 21 is pulled down hooks over the tooth 44 of holding pawl 45 which pawl is mounted on the frame 46 secured to the side of the casing and is yieldingly held in the position shown in Fig. 2 by means of the spring 47. The pawl 45 has a rearwardly extending arm 48 which when the arm 12 is in lowered position for instance as shown in Fig. 3 is held by means of a second pawl 49 having the shoulder 50 which engages under the free end of the arm 48. A suitable spring indicated at 51 normally tends to move the pawl 49 into the position shown in Fig. 3. Pawl 49 also has a lever arm 52 which is adapted to be engaged by depending link 53 pivoted at 54 to the lever arm 12.

Having once been latched down by means of the latch 41 and tooth 44, lever arm 21 will be held in the lowermost position with the damper open so long as the fuel feeding shaft on which the crank 10 is mounted continues to operate. However, when the crank 10 is stopped in its uppermost position, the spring 22 gradually pulls arm 12 up, the rate depending on the setting of the valve 18 and the by-pass of the dash pot 16 which is filled with a suitable oil or other liquid substance.

When the arm 12 approaches its upper position, the link 53 will move the arm 52 of pawl 49 upwardly thus forcing the shoulder 50 out from under the extension 48 of locking pawl 45. When this happens, the pawl 45 is free to turn against the tension of the spring 47 so as to permit tooth 44 to move upwardly and disengage from the latch 41, arm 21 being pulled upwardly by the weight 34 at all times. Release of the latch 41 permits the arm 21 to move upwardly at a rate governed by the dash pot 37 until the arm 21 strikes the stop 40 where the arm will stay until such further time as the fuel feeding operation again begins when the arm 21 will be pulled down and latched in the manner hereinbefore described so as to open the damper during the fuel feeding interval.

The shaft 13 also performs another function as illustrated in my prior application, namely that of opening the over-fire doors of the furnace and opening the steam supply jet when the damper is open. In the present device, this is accomplished by means of the link 55 connected by a suitable arm 56 to shaft 13. Shaft 13 is free to rotate in its bearings in the casing, and the arms 12 and 21 are rotatably mounted on this shaft. The hub of arm 21, however, has a lateral extension at 57 which abuts the bearing on the casing for the shaft and which extends only part way around the shaft. Pin 58 extends through the shaft in line with this abutment and is so positioned with respect to the abutment that lever arm 21 must swing down substantially into horizontal position before the abutment will engage the pin and rotate the shaft 13. Thereafter on further downward movement of the arm 21 toward the position shown in Fig. 3, shaft 13 will be turned in the direction of the arrow shown in Fig. 1 to raise the link 55 which is in turn operatively connected—as shown in my prior application hereinbefore referred to—so as to effect the opening of the steam supply lines and the over-fire air supply doors. In the return of the arm 21 to its raised position, the first operation is during the lower half of its movement sufficient to allow shaft 13 to turn and close the over-fire doors and steam supply line. The adjusting screw 40 is preferably made so that its lower limit will only hold the arm 21 down to horizontal position. Thus it is possible to completely control the over-fire doors and steam jet even though the damper is left partly open to allow gas to escape from the furnace.

From the above description, it will be seen that I have provided a comparatively simple yet rugged construction whereby the opening and closing of the damper of a furnace may be automatically accomplished from a drive shaft operating in conjunction with the fuel feeding means. This construction has great advantages in that the adjustments at the time period between the shutting off of the fuel feeding means and the closing of the damper may be varied through a wide range by merely adjusting the valve on the dash pot 37 and also in that the adjustment of the damper position itself in either open or closed position is practically unlimited due to the provision of the stop 40 and the connections of the flexible member 28 to the arm 21.

Having thus described my invention, what I claim as new and desire to secure by Letters Patent is:

1. In damper control mechanism, a damper, means for maintaining the damper in open position while a drive element is operating and moving it into closed position when the drive element stops comprising a shaft, a pair of lever arms thereon one having connection with the damper and the other with the drive element, means for causing said arms to move in unison to open the damper, latch means for latching the damper connected arm in position on completion of the opening movement, and means operated by the other lever arm upon stopping of the drive means to release said latch means, said damper having means tending to move it to closed position.

2. A damper control mechanism for furnaces comprising a damper, means yieldingly urging said damper into closed position, a drive element, means connecting said drive element and damper operating to open said damper and retain it open during operation of said drive element, and release means becoming operative upon stopping said drive element to release said damper whereby said first named means may close the damper, said connecting means including a lever arm connected to said damper so as to be held up when the damper is closed, means including a second arm pivoted on the same axis as said lever arm and operated by said drive element for moving said arm down, and latch means for retaining said arm in lower position, said release means operating said latch means.

3. A damper control mechanism for furnaces comprising a damper, means yieldingly urging said damper into closed position, a drive element, means connecting said drive element and damper operating to open said damper and retain it open during operation of said drive element, and release means becoming operative upon stopping said drive element to release said damper whereby said first named means may close the damper, said connecting means including a lever arm connected to said damper so as to be held up when the damper is closed, means operated by said drive element for moving said arm down, and latch means for retaining said arm in lower position, and means for variably retarding the closing of said damper.

4. A damper control mechanism for furnaces comprising a damper, means yieldingly urging said damper into closed position, a drive element, means connecting said drive element and damper operating to open said damper and retain it open during operation of said drive element, and release means becoming operative upon stopping said drive element to release said damper whereby said first named means may close the damper, said connecting means including a lever arm connected to said damper so as to be held up when the damper is closed, means operated by said drive element for moving said arm down, and latch means for retaining said arm in lower position, and means for variably retarding the closing of said damper comprising a dash pot connected with said lever arm.

5. A damper control mechanism for furnaces comprising a damper, means yieldingly urging said damper into closed position, a drive element, means connecting said drive element and damper operating to open said damper and retain it open during operation of said drive element, and release means becoming operative upon stopping said drive element to release said damper whereby said first named means may close the damper, said connecting means including a lever arm connected to said damper so as to be held up when the damper is closed, means operated by said drive element for moving said arm down, and latch means for retaining said arm in lower position, said release means operating said latch means, and means for varying the period of time after said driving element stops before said release means releases the latch.

6. A damper control mechanism for furnaces comprising a damper, means yieldingly urging said damper into closed position, a drive element, means connecting said drive element and damper operating to open said damper and retain it open during operation of said drive element, and release means becoming operative upon stopping said drive element to release said damper whereby said first named means may close the damper, said connecting means including a lever arm connected to said damper so as to be held up when the damper is closed, means operated by said drive element for moving said arm down, and latch means for retaining said arm in lower position, said release means operating said latch means, and means for varying the period of time after said driving element stops before said release means releases the latch comprising a dash pot associated with said release means.

7. A damper control mechanism for furnaces comprising a damper, means yieldingly urging said damper into closed position, a drive element, means connecting said drive element and damper operating to open said damper and retain it open during operation of said drive element, and release means becoming operative upon stopping said drive element to release said damper whereby said first named means may close the damper, said connecting means including a lever arm connected to said damper so as to be held up when the damper is closed, means operated by said drive element for moving said arm down, and latch means for retaining said arm in lower position, said release means operating said latch means, and means for variably retarding the closing of said damper.

8. A damper control mechanism for furnaces comprising a damper, means yieldingly urging said damper into closed position, a drive element, means connecting said drive element and damper operating to open said damper and retain it open during operation of said drive element, and release means becoming operative upon stopping said drive element to release said damper whereby said first named means may close the damper, said connecting means including a lever arm connected to said damper so as to be held up when the damper is closed, means operated by said drive element for moving said arm down, and latch means for retaining said arm in lower position, said release means operating said latch means, and means for varying the period of time after said driving element stops before said release means releases the latch, and means for variably retarding the closing of said damper.

9. A damper control mechanism for furnaces comprising a damper, means yieldingly urging said damper into closed position, a drive element, means connecting said drive element and damper operating to open said damper and retain it open during operation of said drive element, and release means becoming operative upon stopping said drive element to release said damper whereby said first named means may close the damper, said connecting means including a lever arm connected to said damper so as to be held up when the damper is closed, means operated by said drive element for moving said arm down, and latch means for retaining said arm in lower position, said release means operating said latch means, and means for variably retarding the closing of said damper comprising a dash pot connected with said lever arm.

In witness whereof, I hereunto subscribe my name this 20th day of May, A. D. 1930.

GEORGE A. KOHOUT.